(12) United States Patent
Kawakami

(10) Patent No.: US 10,644,488 B2
(45) Date of Patent: May 5, 2020

(54) WIRE ASSEMBLY AND VEHICLE INCLUDING WIRE ASSEMBLY

(71) Applicant: TOYOTA JIDOSHA KABUSHIKI KAISHA, Toyota-shi, Aichi-ken (JP)

(72) Inventor: Hiroki Kawakami, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/255,130

(22) Filed: Jan. 23, 2019

(65) Prior Publication Data

US 2019/0245333 A1   Aug. 8, 2019

(30) Foreign Application Priority Data

Feb. 6, 2018   (JP) .................. 2018-019409

(51) Int. Cl.
| | | |
|---|---|---|
| *B60R 16/023* | (2006.01) | |
| *H01B 7/04* | (2006.01) | |
| *H02G 3/04* | (2006.01) | |
| *B60R 16/02* | (2006.01) | |
| *H01B 7/00* | (2006.01) | |
| *H01B 7/08* | (2006.01) | |

(52) U.S. Cl.
CPC ....... *H02G 3/0443* (2013.01); *B60R 16/0207* (2013.01); *H01B 7/0045* (2013.01); *H01B 7/0081* (2013.01); *H02G 3/0437* (2013.01); *B60R 16/023* (2013.01); *H01B 7/04* (2013.01); *H01B 7/0846* (2013.01)

(58) Field of Classification Search
CPC .............. H02G 3/0443; B60R 16/0207; B60R 16/023; H01B 7/0045; H01B 7/0081; H01B 7/04

USPC ........................................................ 174/70 R
See application file for complete search history.

(56) References Cited

U.S. PATENT DOCUMENTS

| | | | | |
|---|---|---|---|---|
| 4,783,953 A * | 11/1988 | Akre | .................... | G02B 6/4489 385/106 |
| 5,072,193 A * | 12/1991 | Wilson | ................... | H05K 3/341 330/66 |
| 5,668,912 A * | 9/1997 | Keller | .................. | G02B 6/4403 385/100 |
| 6,528,728 B1 * | 3/2003 | Shima | .................. | H02G 3/0437 174/101 |
| 6,714,708 B2 * | 3/2004 | McAlpine | ............ | G02B 6/4407 385/110 |
| 8,697,994 B2 * | 4/2014 | Masaka | .............. | G03G 21/1652 174/480 |
| 9,425,600 B2 * | 8/2016 | Yiasoumi | ................. | H02G 3/38 |
| 9,462,684 B2 * | 10/2016 | Tanaka | .................... | H05K 1/028 |
| 9,734,938 B2 * | 8/2017 | Kassab | .................. | H01B 7/048 |
| 2003/0034756 A1 * | 2/2003 | Chang | .................... | B60R 11/02 320/107 |

(Continued)

FOREIGN PATENT DOCUMENTS

JP        2014-116286 A        6/2014

*Primary Examiner* — Timothy J Thompson
*Assistant Examiner* — Michael F McAllister
(74) *Attorney, Agent, or Firm* — Oliff PLC

(57) ABSTRACT

A wire assembly that is provided in a vehicle or the like includes a flexible wire, and a rigid wire. The rigid wire is made of a rigid material and has a recess portion extending along a longitudinal direction of the rigid wire. The flexible wire is disposed in the recess portion of the rigid wire.

8 Claims, 4 Drawing Sheets

(56) References Cited

U.S. PATENT DOCUMENTS

| | | | | |
|---|---|---|---|---|
| 2006/0131062 A1* | 6/2006 | Bertges | ............... | H01B 7/223 174/128.1 |
| 2008/0156529 A1* | 7/2008 | Charon | ............... | H02G 3/0418 174/99 R |
| 2008/0156553 A1* | 7/2008 | Hoogenraad | ............ | B60K 6/48 180/65.29 |
| 2011/0318974 A1* | 12/2011 | Timsit | ............... | H01R 4/18 439/816 |
| 2012/0094548 A1* | 4/2012 | Lumpkins | ............ | H01M 10/425 439/801 |
| 2012/0205134 A1* | 8/2012 | Brasier | ............... | H02G 3/0406 174/68.3 |
| 2013/0068522 A1* | 3/2013 | Ogawa | ............... | B60R 16/0215 174/72 A |
| 2013/0240263 A1* | 9/2013 | Onodi | ............... | A62C 3/16 174/70 R |
| 2014/0131071 A1 | 5/2014 | Tanaka et al. | | |
| 2014/0209764 A1* | 7/2014 | Jackson, Jr. | ............ | H02G 3/0431 248/73 |
| 2015/0222101 A1* | 8/2015 | Kajiwara | ............ | B60R 16/0215 174/72 A |
| 2016/0099091 A1* | 4/2016 | Glew | ............... | H01B 7/295 174/70 R |
| 2018/0019039 A1* | 1/2018 | Kassab | ............... | A61B 5/0538 |

* cited by examiner

WIRE ASSEMBLY AND VEHICLE INCLUDING WIRE ASSEMBLY

INCORPORATION BY REFERENCE

The disclosure of Japanese Patent Application No. 2018-019409 filed on Feb. 6, 2018 including the specification, drawings and abstract is incorporated herein by reference in its entirety.

BACKGROUND

1. Technical Field

The present disclosure relates to a wire assembly, and relates also to a vehicle including a wire assembly.

2. Description of Related Art

There is a vehicle in which, as a structure in which a wire assembly 160 having a plurality of wires, such as a power line or a communication line, is routed in a vehicle, a routing structure provided at, for example, a vehicle body side portion 100 shown in FIGS. 4 and 5, is employed. In the routing structure, the wire assembly 160 is pinched by a first protector 160A and a second protector 160B, thereby bundling together a plurality of wires.

A structure in which a wire, such as a power line, in the wire assembly having a plurality of wires is substituted with a strip-shaped flat wire has been suggested. The flat wire is disclosed in, for example, Japanese Unexamined Patent Application Publication No. 2014-116286 (JP 2014-116286 A).

SUMMARY

Even though a wire, such as a power line, is substituted with a flat wire, when other wires, such as a communication line, are routed together with the flat wire, a fixing member for a wire, such as a protector made of resin, for bundling together the flat wire and other wires is needed. For this reason, in a structure in which a flat wire and other wires are routed together, there is room for improvement in terms of structure and cost.

The disclosure provides a wire assembly having a structure capable of bundling together and routing a plurality of wires while avoiding a use of a fixing member for a wire assembly, and a vehicle including a wire assembly.

A first aspect of the disclosure relates to a wire assembly that is provided in a vehicle or the like. The wire assembly includes a flexible wire, and a rigid wire that is made of a rigid material and has a recess portion extending along a longitudinal direction of the rigid wire. The flexible wire is disposed in the recess portion of the rigid wire.

With the wire assembly according to the first aspect of the disclosure, it is possible to bundle together and route the rigid wire and the flexible wire. Furthermore, since a fixing member for a wire, such as a protector made of resin, is not used in order to bundle together the rigid wire and the flexible wire, it is possible to reduce routing cost.

In the wire assembly according to the first aspect of the disclosure, the recess portion of the rigid wire has a perpendicular cross-section of one of a U-shape and a V-shape in a transverse direction of the rigid wire.

In addition, the wire assembly according to the first aspect of the disclosure may further include a bundling member wound around the rigid wire to cover the rigid wire.

In addition, in the wire assembly according to the first aspect of the disclosure, at least a part of the rigid wire may be made of a conductive material.

In addition, in the wire assembly according to the first aspect of the disclosure, the flexible wire may be composed of a plurality of wires.

In addition, in the wire assembly according to the first aspect of the disclosure, the flexible wire may be disposed in the recess portion, as viewed in a cross-section of the recess portion.

In addition, in the wire assembly according to the first aspect of the disclosure, the flexible wire may extend through the recess portion.

A second aspect of the disclosure relates to a vehicle. The vehicle includes the wire assembly according to the first aspect. The wire assembly is disposed so as to extend in a front-rear direction of the vehicle.

With the wire assembly having the structure according to the aspect of the disclosure, it is possible to bundle together and route a plurality of wires, such as the rigid wire and other wires, while reducing a fixing member for a wire.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Outline

Figure 1:
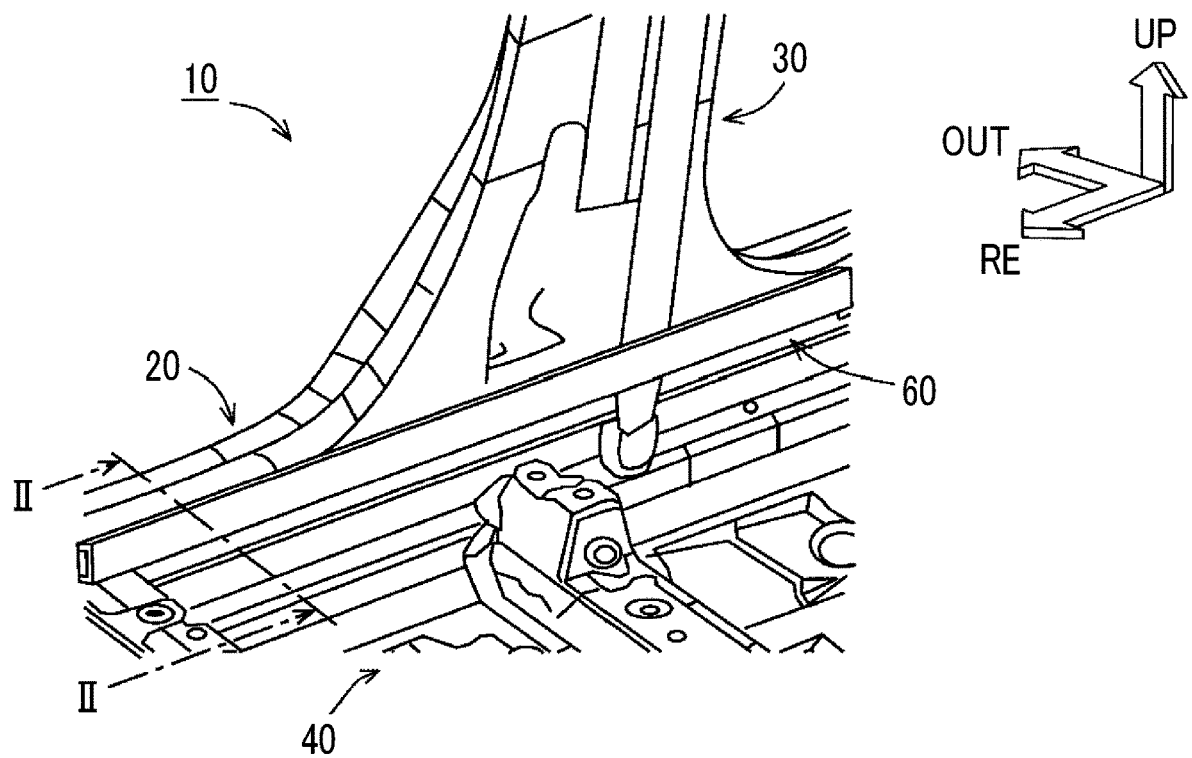
FIG. 1 is a rear perspective view of a vehicle including a wire assembly according to an embodiment.

In a wire assembly according to an embodiment, a recess portion where a flexible wire is housed and disposed is formed in a rigid wire made of a rigid material. With the wire structure, it is possible to bundle together and route the rigid wire and the flexible wire, and to reduce routing cost.

Hereinafter, a vehicle including a routing structure of a rigid wire according to the embodiment will be described in detail referring to the drawings. In the drawings, an arrow UP indicates an upper side in a vehicle up-down direction, an arrow RE indicates a rear side in a vehicle front-rear direction, and an arrow OUT indicates an outer side in a vehicle width direction.

Structure of Vehicle

Figure 2:
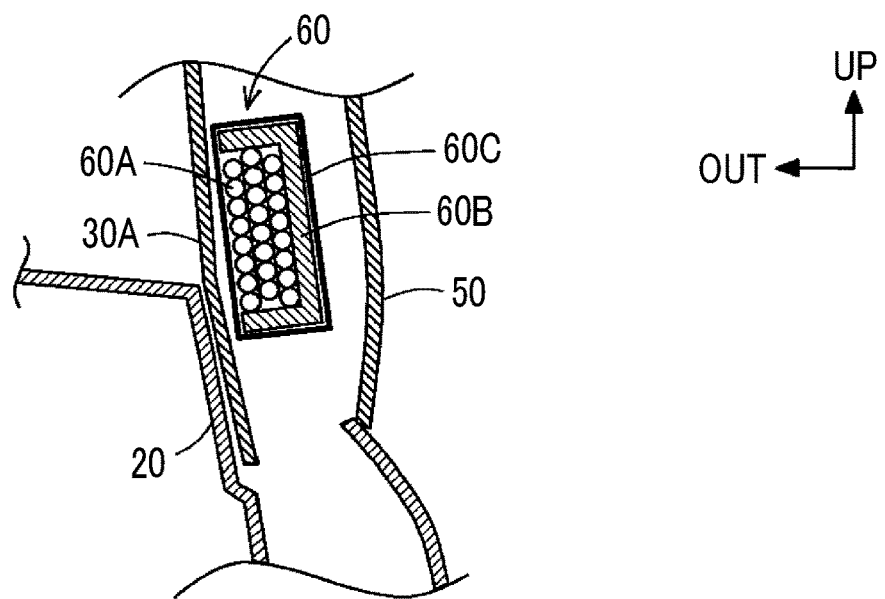
FIG. 2 is a sectional view taken along the line II-II in a vehicle body side portion shown in FIG. 1.

FIG. 1 is a perspective view of a structure of a main part in a vehicle body side portion 10 of a vehicle including a wire assembly according to an embodiment when viewed obliquely from a vehicle right side. FIG. 2 is a sectional view taken along the line II-II in the vehicle body side portion 10 shown in FIG. 1. In the sectional view of FIG. 2, a configuration that is not shown in FIG. 1 is included. In the embodiment, although a structure on the left side of the vehicle body side portion 10 will be described, the same can apply the right side of the vehicle body side portion 10.

As shown in FIGS. 1 and 2, a rocker panel 20 that is a member forming a skeleton of a vehicle body extends in a front-rear direction of the vehicle in a lower portion of the vehicle body side portion 10. The rocker panels 20 are provided on both sides of the vehicle in the vehicle width direction bilaterally symmetrically (in this case, "bilaterally symmetrically" has a meaning including "substantially bilaterally symmetrically"). A lower end portion of a center pillar 30 and an end portion of a floor panel 40 in the vehicle width direction are connected to a predetermined position of the rocker panel 20.

The rocker panel 20 includes a rocker outer panel provided on an outer side in the vehicle width direction and a rocker inner panel provided on an inner side in the vehicle width direction, and the rocker outer panel and the rocker inner panel are bonded to form a rectangular (in this case, "rectangular" has a meaning including "substantially rectangular") hollow closed cross-section structure (not shown). The rocker panel 20 in the following description of the embodiment indicates the rocker inner panel.

A pillar inner panel 30A constituting the center pillar 30 is bonded to the rocker panel 20 by spot welding or the like such that the pillar inner panel 30A is provided inward of the rocker panel 20 in the vehicle width direction. A wire assembly 60 described below is disposed so as to extend in a front-rear direction of the vehicle such that the wire assembly 60 is provided inward of the pillar inner panel 30A in the vehicle width direction. The wire assembly 60 is covered with an interior trim 50.

Figure 3:
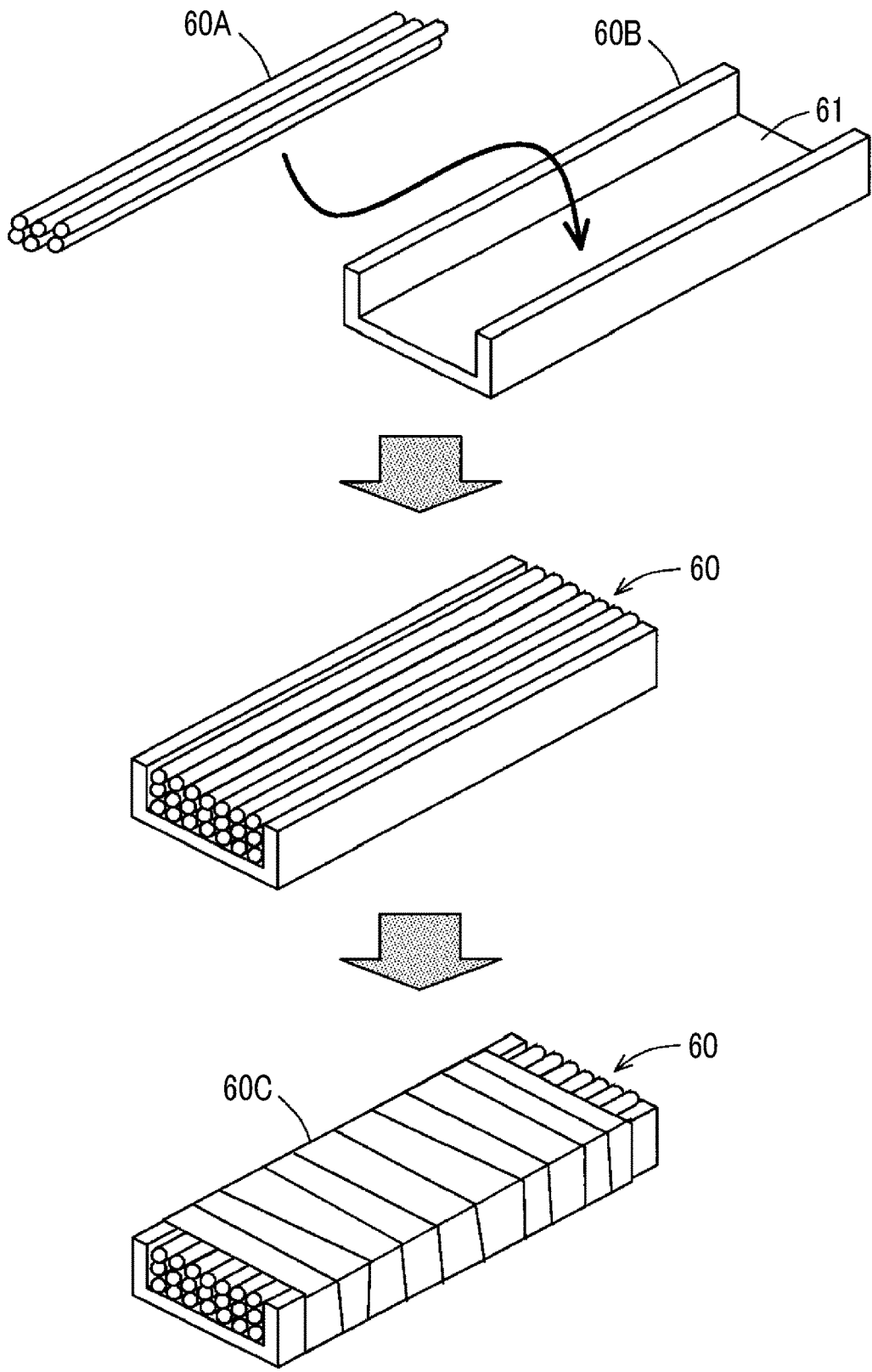
FIG. 3 is a diagram illustrating the configuration of the wire assembly according to the embodiment.
Figure 4:
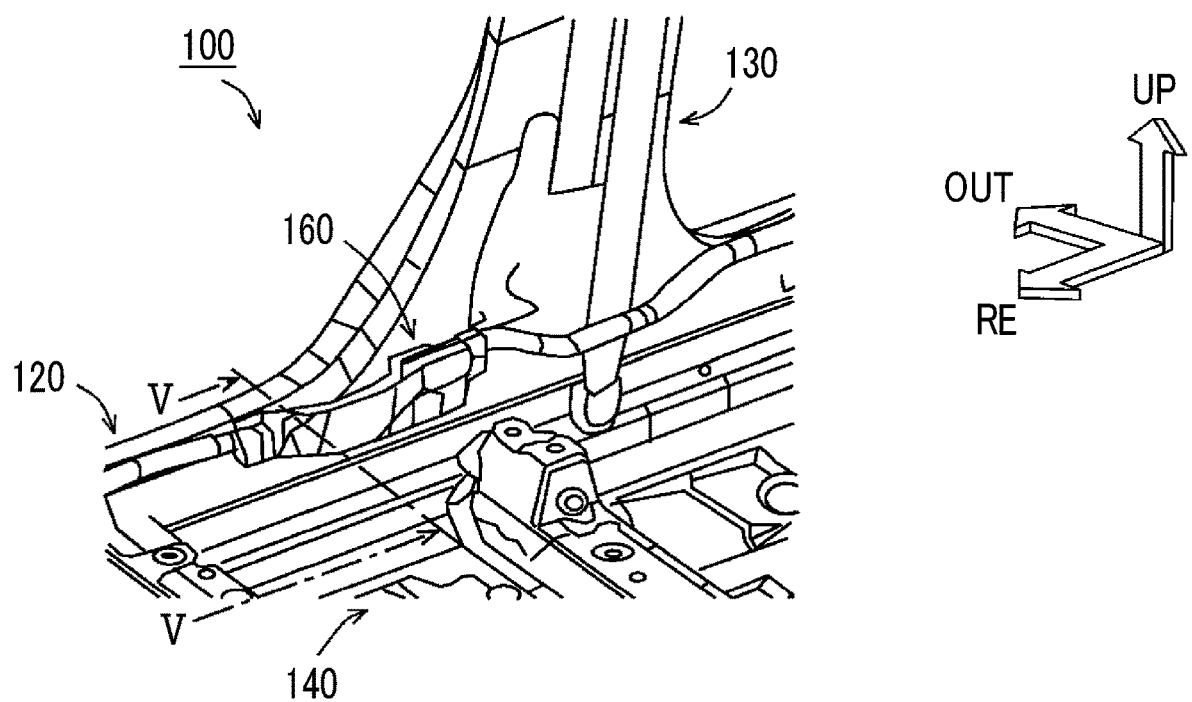
FIG. 4 is a rear perspective view of a vehicle including a wire assembly of the related art.
Figure 5:
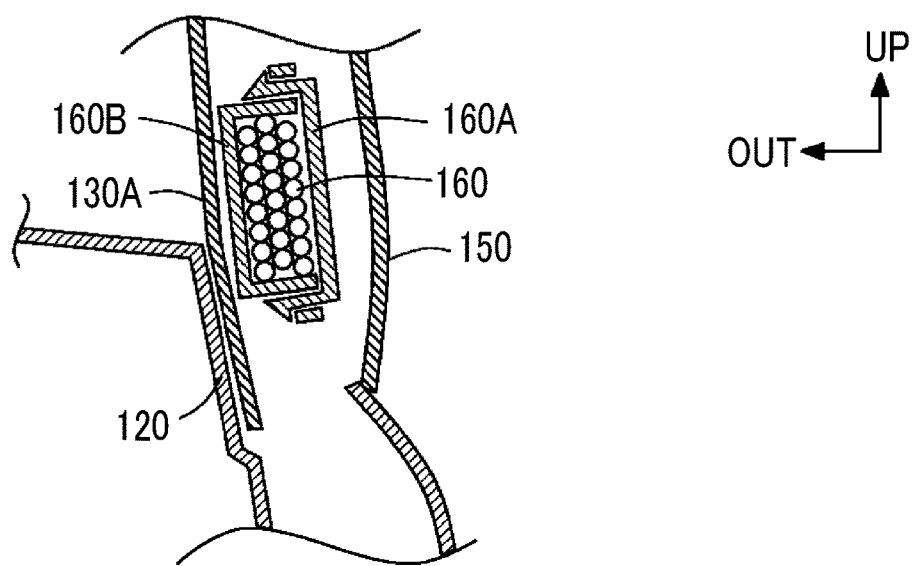
FIG. 5 is a sectional view taken along the line V-V in a vehicle body side portion shown in FIG. 4.

In addition, the wire assembly 60 will be described referring to FIG. 3. FIG. 3 is a diagram illustrating the configuration of the wire assembly 60 according to the embodiment. The wire assembly 60 includes a flexible wire 60A, a rigid wire 60B, and a bundling member 60C.

Figure 6A:
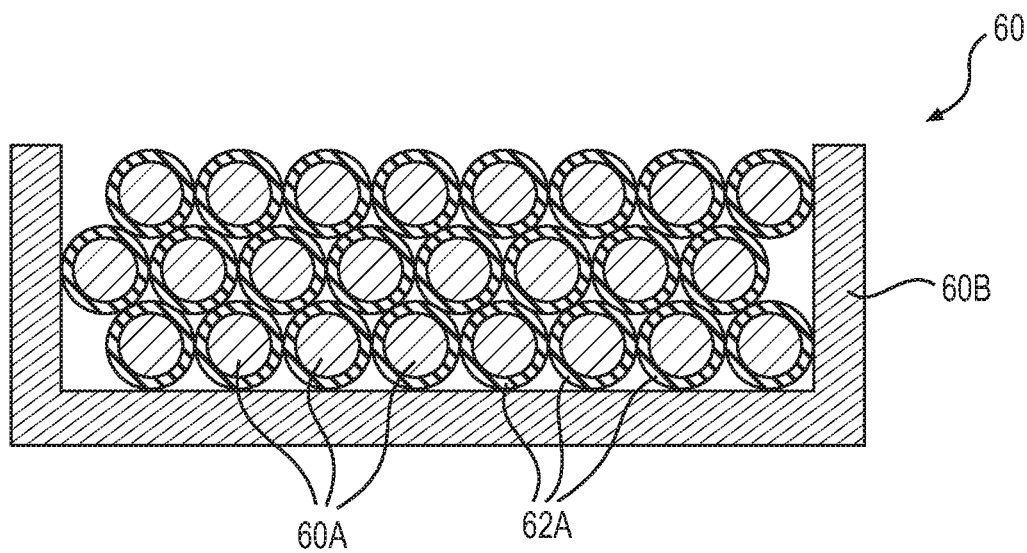
FIG. 6A is a sectional view of an embodiment of the wire assembly with the flexible wire coated with an insulating film.

The flexible wire 60A is a wire having one or a plurality of wires, such as a communication line. In the flexible wire 60A, a portion where electrical connection is not needed, other than a connection terminal, is coated with, for example, an insulating film 62A or the like, and is electrically insulated (as shown in FIG. 6A).

Figure 6B:
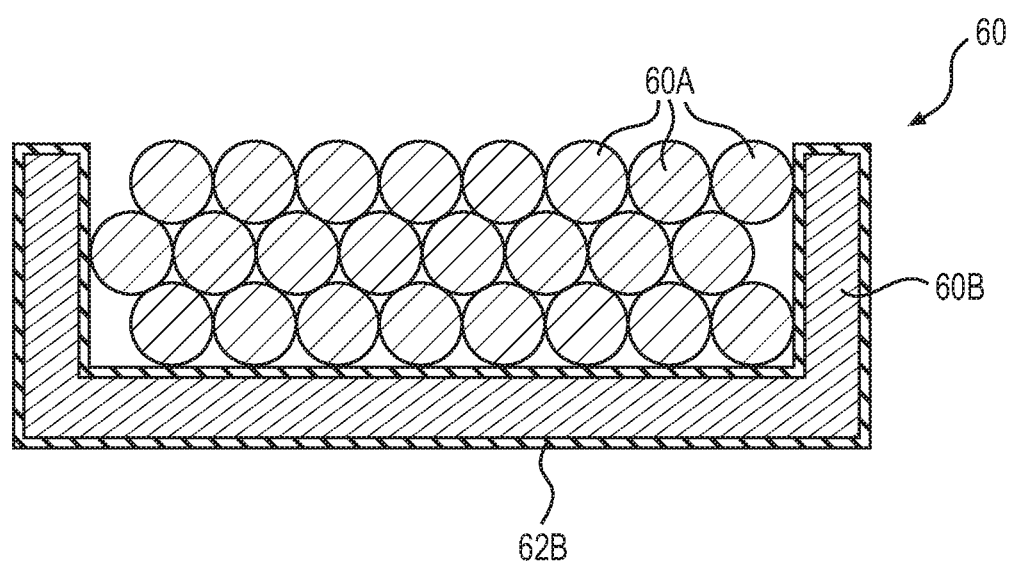
FIG. 6B is a sectional view of an embodiment of the wire assembly with the rigid wire coated with an insulating film.

The rigid wire 60B is, for example, a strip-shaped member formed of a conductive rigid material, such as iron, copper, or aluminum. The rigid wire 60B is, for example, a power line for supplying power to a load, such as an electronic control unit (ECU) (not shown) mounted in the vehicle. The rigid wire 60B has a recess portion 61 that extends in a longitudinal direction as a routing direction and where the flexible wire 60A is housed and disposed. The recess portion 61 may be formed by bending a flat plate or may be formed by extrusion molding. A shape of the recess portion 61 is not particularly limited as long as the flexible wire 60A can be housed, and for example, the recess portion 61 may have a shape of a perpendicular cross-section of one of a U-shape and a V-shape in a transverse direction. A portion where electrical connection is not needed, other than a connection terminal, in the rigid wire 60B is coated with, for example, an insulating film 62B or the like, and is electrically insulated (as shown in FIG. 6B).

The bundling member 60C may be an insulating tape, film, or the like, such as a vinyl tape. The bundling member 60C is a member that fixes the flexible wire 60A housed in the recess portion 61 of the rigid wire 60B so as not to protrude from the recess portion 61. Fixing of the flexible wire 60A can be carried out by wrapping an outer periphery of the rigid wire 60B with the bundling member 60C in a state in which the flexible wire 60A is housed in the recess portion 61 of the rigid wire 60B.

Operations and Effects of Embodiment

As described above, with the wire 60 according to the embodiment, the recess portion 61 where the flexible wire 60A is housed and disposed is formed in the rigid wire 60B formed of a rigid material.

With the wire structure, it is possible to bundle together and route the rigid wire 60B and the flexible wire 60A. Furthermore, since a fixing member for a wire, such as a protector made of resin, is not used in order to bundle together the rigid wire 60B and the flexible wire 60A, it is possible to reduce routing cost.

The recess portion 61 has a perpendicular cross-section of one of a U-shape and a V-shape in the transverse direction to suppress bending of the rigid wire 60B, whereby it is possible to improve rigidity of the rigid wire 60B (improvement of a cross-sectional secondary moment). Furthermore, it is possible to set a fixing point to any position of the rigid wire 60B with design of rigidity. In addition, it is possible to easily design the shape of the recess portion 61 to an appropriate shape according to the number of flexible wires 60A to be housed (cross-sectional area).

Other Configurations

The rigid wire 60B having the recess portion 61 may not be formed of the same conductive material. For example, a wire may be made in which a conductive material is in a flat plate shape and the recess portion 61 is formed by molding resin coating the conductive material. With this, it is possible to further reduce routing cost and to reduce the weight of the vehicle.

The shape of the flexible wire 60A may be resin-molded in conformity with the shape of the recess portion 61 of the rigid wire 60B in advance, and the flexible wire 60A may be pressed and fitted into the recess portion 61 of the rigid wire 60B. With this, it is possible to reduce the bundling member 60C.

The wire assembly according to the embodiment is usable in a vehicle, such as an automobile, and is useful when a plurality of wirings is bundled together and routed, or the like.

What is claimed is:

1. A wire assembly comprising:
   a rigid wire composed of a rigid material and having a recess extending along a longitudinal direction thereof;
   a flexible wire disposed in the recess;
   a bundling member disposed around the rigid wire that covers the rigid wire; and
   an insulating film that covers at least one of the flexible wire or the rigid wire.

2. The wire assembly according to claim 1, wherein the recess has a perpendicular cross-section of one of a U-shape or a V-shape in a transverse direction of the rigid wire.

3. The wire assembly according to claim 1, wherein at least a part of the rigid wire is composed of a conductive material.

4. The wire assembly according to claim 1, wherein the flexible wire is composed of a plurality of wires.

5. The wire assembly according to claim 1, wherein the flexible wire is disposed in the recess, as viewed in a cross-section of the recess.

6. The wire assembly according to claim 1, wherein the flexible wire extends through the recess.

7. A vehicle comprising:
   the wire assembly according to claim 1,
   wherein the wire assembly is disposed so as to extend in a front-rear direction of the vehicle.

8. The wire assembly according to claim 1, wherein the flexible wire and the rigid wire are electrically insulated from each other.

* * * * *